United States Patent
Pico

(10) Patent No.: US 10,725,933 B2
(45) Date of Patent: Jul. 28, 2020

(54) METHOD AND APPARATUS FOR REDIRECTING MEMORY ACCESS COMMANDS SENT TO UNUSABLE MEMORY PARTITIONS

(71) Applicant: Intel Corporation, Santa Clara, CA (US)

(72) Inventor: Lady Nataly Pinilla Pico, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 15/394,933

(22) Filed: Dec. 30, 2016

(65) Prior Publication Data

US 2018/0188960 A1    Jul. 5, 2018

(51) Int. Cl.
*G06F 12/00* (2006.01)
*G06F 13/00* (2006.01)
*G06F 12/121* (2016.01)
*G06F 3/06* (2006.01)

(52) U.S. Cl.
CPC .......... *G06F 12/121* (2013.01); *G06F 3/0616* (2013.01); *G06F 3/0638* (2013.01); *G06F 3/0659* (2013.01); *G06F 3/0679* (2013.01)

(58) Field of Classification Search
CPC ...... G06F 3/0604; G06F 3/0644; G06F 3/068; G06F 12/121; G06F 2212/69
USPC ........................................................ 711/159
See application file for complete search history.

(56) References Cited

U.S. PATENT DOCUMENTS

| | | | | |
|---|---|---|---|---|
| 4,355,376 A * | 10/1982 | Gould | ................... | G11C 29/76 365/200 |
| 4,498,146 A * | 2/1985 | Martinez | ............ | G11B 20/1883 360/31 |
| 5,237,553 A * | 8/1993 | Fukushima | .............. | G11B 7/00 369/275.3 |
| 6,014,753 A * | 1/2000 | Miyamoto | ........ | H04L 29/12009 709/203 |
| 6,041,422 A * | 3/2000 | Deas | ...................... | G11C 29/80 712/17 |
| 6,212,647 B1 * | 4/2001 | Sims, III | ................ | G11B 20/10 711/112 |
| 6,426,893 B1 * | 7/2002 | Conley | ............... | G06F 12/0246 365/185.09 |
| 6,484,271 B1 * | 11/2002 | Gray | ...................... | G11C 29/70 714/6.1 |
| 7,360,073 B1 * | 4/2008 | Billstrom | .............. | G06F 21/575 713/1 |
| 7,362,675 B2 * | 4/2008 | Hwang | ............. | G11B 7/00736 369/30.21 |

(Continued)

*Primary Examiner* — Sheng Jen Tsai
(74) *Attorney, Agent, or Firm* — Alliance IP, LLC

(57) ABSTRACT

In one embodiment, an apparatus comprises a plurality of memory partitions, each memory partition comprising an array of 3D crosspoint memory, and a storage device controller comprising a memory comprising memory cells to store addresses of replacement memory partitions and addresses of unusable memory partitions and a partition address translation engine coupled to the memory, the partition address translation engine comprising logic to determine whether to redirect a memory access command received from a host computing device to a replacement memory partition based on the contents of the memory.

27 Claims, 7 Drawing Sheets

(56) References Cited

U.S. PATENT DOCUMENTS

| | | | | |
|---|---|---|---|---|
| 7,743,290 B2* | 6/2010 | Furuhjelm | | G11C 16/349 365/185.33 |
| 7,864,486 B2* | 1/2011 | Aso | | G11B 5/59633 360/77.08 |
| 7,961,569 B2* | 6/2011 | Al | | G11B 20/1883 369/47.14 |
| 9,142,271 B1* | 9/2015 | Srinivasan | | G11C 7/12 |
| 9,411,696 B2* | 8/2016 | Lee | | G11C 29/72 |
| 2001/0042223 A1* | 11/2001 | Hoskins | | G11B 20/1883 714/6.13 |
| 2001/0052093 A1* | 12/2001 | Oshima | | G11C 29/56 714/719 |
| 2003/0041211 A1* | 2/2003 | Merkey | | G06F 11/1076 711/114 |
| 2004/0004866 A1* | 1/2004 | Hidaka | | G11C 29/808 365/200 |
| 2004/0015674 A1* | 1/2004 | Lakhani | | G06F 12/0246 711/206 |
| 2004/0022249 A1* | 2/2004 | Katayama | | G11C 16/349 370/395.7 |
| 2004/0034825 A1* | 2/2004 | Jeddeloh | | G11C 29/44 714/733 |
| 2004/0196707 A1* | 10/2004 | Yoon | | G06F 12/0246 365/200 |
| 2005/0097393 A1* | 5/2005 | de Brebisson | | G11C 29/76 714/6.13 |
| 2005/0097406 A1* | 5/2005 | Brebisson | | G06F 11/1666 714/52 |
| 2005/0144516 A1* | 6/2005 | Gonzalez | | G06F 12/0246 714/6.13 |
| 2005/0147003 A1* | 7/2005 | Hwang | | G11B 7/00736 369/47.14 |
| 2005/0201229 A1* | 9/2005 | Sasaki | | G11B 20/1883 369/47.14 |
| 2006/0215432 A1* | 9/2006 | Wickeraad | | G11C 29/44 365/49.15 |
| 2007/0159897 A1* | 7/2007 | Wang | | G06F 11/1435 365/200 |
| 2007/0201321 A1* | 8/2007 | Sasaki | | G11B 19/12 369/44.13 |
| 2008/0065937 A1* | 3/2008 | Micheloni | | G06F 11/1068 714/711 |
| 2008/0229143 A1* | 9/2008 | Muraki | | G06F 11/2028 714/5.11 |
| 2008/0244340 A1* | 10/2008 | Doi | | G11C 29/56 714/711 |
| 2009/0077434 A1* | 3/2009 | Furuhjelm | | G11C 16/349 714/710 |
| 2009/0282301 A1* | 11/2009 | Flynn | | G06F 11/006 714/710 |
| 2010/0142275 A1* | 6/2010 | Yogev | | G06F 12/0238 365/185.09 |
| 2010/0146239 A1* | 6/2010 | Gabai | | G06F 12/0246 711/202 |
| 2010/0180182 A1* | 7/2010 | Trantham | | G06F 11/1008 714/799 |
| 2010/0281202 A1* | 11/2010 | Abali | | G06F 12/0246 711/103 |
| 2013/0208548 A1* | 8/2013 | Hung | | G11C 29/808 365/189.05 |
| 2014/0075099 A1* | 3/2014 | Ooneda | | G06F 11/1048 711/103 |
| 2014/0173225 A1* | 6/2014 | Chatterjee | | G06F 9/3824 711/158 |
| 2014/0245096 A1* | 8/2014 | Motwani | | H03M 13/13 714/755 |
| 2014/0359382 A1* | 12/2014 | Choi | | G06F 11/2094 714/710 |
| 2015/0039948 A1* | 2/2015 | Um | | G06F 11/0706 714/710 |
| 2015/0162382 A1* | 6/2015 | Sekar | | G11C 13/0069 365/148 |
| 2015/0294684 A1* | 10/2015 | Qjang | | G11B 5/012 360/48 |
| 2015/0331623 A1* | 11/2015 | Dong | | G06F 11/073 714/710 |
| 2017/0177246 A1* | 6/2017 | Miller | | G06F 11/1666 |
| 2018/0060148 A1* | 3/2018 | Rudy | | G06F 11/076 |
| 2018/0089099 A1* | 3/2018 | Raj | | G06F 12/10 |

* cited by examiner

METHOD AND APPARATUS FOR REDIRECTING MEMORY ACCESS COMMANDS SENT TO UNUSABLE MEMORY PARTITIONS

FIELD

The present disclosure relates in general to the field of computer development, and more specifically, to redirecting memory access commands sent to unusable memory partitions.

BACKGROUND

A computer system may include one or more central processing units (CPUs) which may communicate with one or more storage devices. A CPU may include a processor to execute an operating system and/or other software applications that utilize a storage device coupled to the CPU. The software applications may write data to and read data from the storage device.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
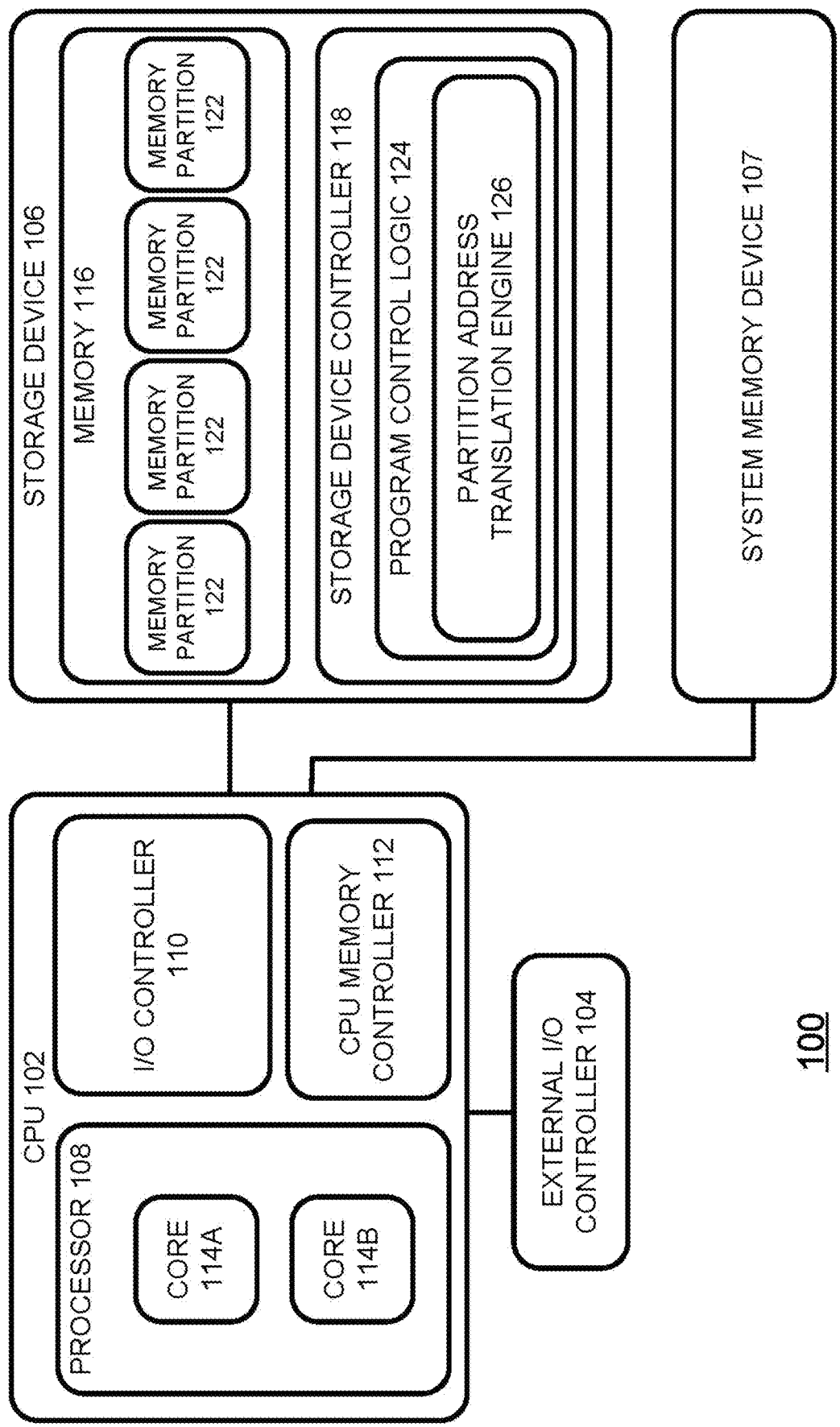
FIG. 1 illustrates a block diagram of components of a computer system in accordance with certain embodiments.

FIG. 1 illustrates a block diagram of components of a computer system 100 in accordance with certain embodiments. System 100 includes a central processing unit (CPU) 102 coupled to an external input/output (I/O) controller 104, a storage device 106, and system memory device 107. During operation, data may be transferred between a storage device 106 or system memory device 107 and the CPU 102. In various embodiments, particular memory access operations (e.g., read and write operations) involving a storage device 106 or system memory device 107 may be issued by an operating system and/or other software applications executed by processor 108. In various embodiments, a storage device 106 may include a memory 116 comprising any suitable number of memory partitions 122.

Various embodiments of the present disclosure provide for redirecting memory access requests for unusable memory partitions. The storage device 106 may support access to the memory 116 by a sequential or random partition selection for memory access operations. However, after fabrication one or more of the memory partitions 122 may not behave as expected and may be unusable. In some situations, even though the other memory partitions 122 are fully functional the storage device may not be sold to customers since the device would not support sequential access of the memory partitions.

Various embodiments of the present disclosure provide sequential access of the usable memory partitions to a user by internally readdressing commands sent to bad partitions thereby redirecting such commands to replacement partitions (that would normally be used as regular partitions if all of the partitions on the device were usable). Such embodiments may allow a storage device to offer sequential access to all usable memory partitions, without increasing the die size by manufacturing the die with redundant memory partitions that are only used as spare partitions. The readdressing may be abstracted from the user (such that the user is not informed as to which particular partitions are bad) and the user may simply be informed as to how many functional partitions are on the storage device.

CPU 102 comprises a processor 108, such as a microprocessor, an embedded processor, a DSP, a network processor, a handheld processor, an application processor, a co-processor, an SOC, or other device to execute code (i.e., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric. CPU 102 may be referred to herein as a host computing device (though a host computing device may be any suitable computing device operable to issue memory access commands to a storage device 106).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices, which may refer to any suitable logic capable of transferring data to and/or receiving data from an electronic system, such as CPU 102. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device. In a particular embodiment, an I/O device may comprise storage device controller 118 of storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 102) or may be integrated on the same chip as the CPU 102.

CPU memory controller 112 is an integrated memory controller that includes logic to control the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store persistent data (e.g., a user's files or instruction sequences) that maintains its state even after power to the system memory device 107 is removed. A system memory device 107 may be dedicated to a particular CPU 102 or shared with other devices (e.g., one or more other processors or other device) of computer system 100.

In various embodiments, a system memory device 107 may include a memory comprising any number of memory partitions, a memory device controller, and other supporting logic (not shown). A memory partition may include non-volatile memory and/or volatile memory. In various embodiments, a memory partition may include an array or other conglomeration of non-volatile memory and/or volatile memory. Non-volatile memory is a storage medium that does not require power to maintain the state of data stored by the medium. Nonlimiting examples of nonvolatile memory may include any or a combination of: planar or 3D NAND flash memory or NOR flash memory, 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less (i.e., at least with respect to the data storage elements of the memory) stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In some embodiments, any portion of memory 107 that is volatile memory can comply with JEDEC standards including but not limited to Double Data Rate (DDR) standards, e.g., DDR3, 4, and 5, or Low Power DDR4 (LPDDR4) as well as emerging standards.

A storage device 106 may store any suitable data, such as data used by processor 108 to provide functionality of computer system 100. For example, data associated with programs that are executed or files accessed by cores 114A and 114B may be stored in storage device 106. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes a storage device controller 118 and a memory 116 comprising four memory partitions 122 operable to store data, however, a storage device may include any suitable number of memory partitions. A memory partition 122 includes a plurality of memory cells that are each operable to store one or more bits. The cells of a memory partition 122 may be arranged in any suitable fashion, such as in rows (e.g., wordlines) and columns (e.g., bitlines), three dimensional structures, sectors, or other manner. In various embodiments, the cells may be logically grouped into banks, blocks, subblocks, wordlines, pages, frames, bytes, or other suitable groups. In various embodiments, a memory partition 122 may include any of the volatile or non-volatile memories listed above or other suitable memory. In a particular embodiment, each memory partition 122 comprises one or more 3D crosspoint memory arrays. 3D crosspoint flash arrays are described in more detail in connection with FIG. 2. In another particular embodiment, each memory partition 122 comprises one or more NAND flash memory arrays.

In various embodiments, storage device 106 may comprise a solid state drive; a hard disk drive; a memory card; a Universal Serial Bus (USB) flash drive; a Non-Volatile Dual In-line Memory Module (NVDIMM); storage integrated within a device such as a smartphone, camera, or media player; or other suitable mass storage device. In particular embodiments, memory partitions 122 each include non-volatile memory. In particular embodiments, memory partitions (and/or storage devices) with non-volatile memory may comply with one or more standards for non-volatile memory promulgated by the Joint Electron Device Engineering Council (JEDEC), such as JESD218, JESD219, JESD220-1, JESD220C, JESD223C, JESD223-1, or other suitable standard (the JEDEC standards cited herein are available at www.jedec.org). In particular embodiments, the storage device comprises NAND flash memory that complies with one or more portions of a standard promulgated by JEDEC for SDRAM memory, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices that implement such standards may be referred to as DDR-based interfaces. For example, a storage device 106 comprising NAND flash memory may receive a command that has a format compliant with a DDR-based standard and may translate the command into one or more commands that are compatible with NAND flash memory of the storage device 106. Similarly, the storage device 106 may format results from operations performed on the NAND flash memory into a format that is compliant with a DDR-based standard before transmitting the results to the CPU 102.

In a particular embodiment, a memory 116 is a semiconductor package. In various embodiments, a semiconductor package may comprise a casing comprising one or more semiconductor dies (also referred to as chips). A package may also comprise contact pins or leads used to connect to external circuits. In a particular embodiment, each memory partition 122 is embodied on its own die. Accordingly, in some embodiments, a memory 116 may be a package that includes a plurality of dies that each include a memory partition 122. However, a package is merely one example of a form a memory 116 may take as a memory device may be any suitable arrangement of one or more memory modules and associated logic in any suitable physical arrangement. For example, although a single physical package may include a single memory 116, multiple memories 116 could be resident on a single package or a memory 116 could be spread across multiple packages. As another example, a memory 116 may be embodied in one or more different physical mediums, such as a circuit board, die, disk drive, other medium, or any combination of thereof (or combination with one or more packages). In other embodiments, a single die may include multiple memory partitions 122 (e.g., all or a portion of the memory partitions 122 of the memory 116). As another example, a memory partition 122 may be embodied in one or more different physical mediums, such as a circuit board, package, disk drive, other medium, or any combination thereof (or in combination with one or more dies).

Storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. A storage device 106 may also include a communication interface to communicate with CPU memory controller 112 or I/O controller 110 in accordance with any suitable logical device interface specification such as NVMe, AHCI, or other suitable specification. In particular embodiments, storage device 106 may comprise multiple communication interfaces that each communicate using a separate protocol with CPU memory controller 112 and/or I/O controller 110.

Storage device controller 118 may include logic to receive requests from CPU 102 (e.g., via CPU memory controller 112 or I/O controller 110), cause the requests to be carried out with respect to memory 116, and provide data associated with the requests to CPU 102 (e.g., via CPU memory controller 112 or I/O controller 110). Controller 118 may also be operable to detect and/or correct errors encountered during memory operation. In an embodiment, controller 118 also tracks the number of times particular cells (or logical groupings of cells) have been written to in order to perform wear leveling and/or to detect when cells are nearing an estimated number of times they may be reliably written to. In performing wear leveling, the storage device controller 118 may evenly spread out write operations among blocks of the memory of memory 116 such that particular blocks are not written to more than other blocks. In various embodiments, controller 118 may also monitor various characteristics of the storage device 106 such as the temperature or voltage and report associated statistics to the CPU 102. Storage device controller 118 can be implemented on the same circuit board or device as memory 116 or on a different circuit board, or device. For example, in some environments, storage device controller 118 may be a centralized storage controller that manages memory operations for multiple different memory 116 (which could each be of the same type of memory or could be of different types) of computer system 100 (and thus could provide storage device controller functionality described herein to any of the memories to which it is coupled).

In various embodiments, the storage device 106 also includes program control logic 124 which is operable to control the programming sequence performed when data is written to or read from memory 116. In various embodiments, program control logic 124 may provide the various voltages (or information indicating which voltages should be provided) that are applied to memory cells during the programming and/or reading of data (or perform other operations initiating data reads or writes), perform error correction, and perform other suitable functions (such as receive and process checkpoint related commands).

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 may be located on the same package or chip as memory 116.

In the illustrated embodiment, the storage device 106 also includes a partition address translation engine 126 to map addresses of bad memory partitions to replacement memory partitions. In the depicted embodiment, the partition address translation engine 126 is shown as part of the program control logic 124 and the storage device controller 118, although in various embodiments, the partition address translation engine 126 may be separate from the program control logic 124 and/or the storage device controller 118 and communicably coupled to the program control logic 124 and/or the storage device controller 118. In various embodiments, the partition address translation engine 126 may be integrated on the same chip or package as the program control logic 124 and/or storage device controller 118 or on a different chip or package. Partition address translation engine 126 is described in more detail in connection with FIG. 3.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in storage device 106 may be located on a single chip or on multiple chips. In various embodiments a storage device 106 and a computing host (e.g., CPU 102) may be located on the same circuit board or on the same device and in other embodiments the storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

In various embodiments, a bus may couple the storage device controller 118 to each memory partition 122 of the memory 116. The storage device controller 118 may receive a memory access command (e.g., a read or a write operation) from a computing host device (e.g., CPU 102). The command may include an address of the particular memory partition 122. In various embodiments, the command may also include an address of a subset of the memory cells within the particular memory partition 122 (e.g., one or more wordlines and/or one or more bitlines or other portion of the memory partition). The storage device controller 118 may directly place the data of the command onto the bus or translate the command into a format compatible with the memory partitions and place the translated command onto the bus. In a particular embodiment, the command placed on the bus may include an address of the memory partition 122 to which the command is addressed (which may be the same address as the address specified in the command received from the computing host device or may be an address of a replacement memory partition 122 that is being used in place of a bad memory partition 122 if the address specified in the command is an address of the bad memory partition). In alternative embodiments, the partition address placed onto the bus may be a physical address that is mapped to a logical partition address received in the command received from the computing host device. When the address placed on the bus matches the address of a particular memory partition 122, that memory partition 122 consumes the command on the bus while the other memory partitions ignore the command after a determination that the command is not addressed to them. In an alternative embodiment, storage device controller 118 may be coupled to each memory partition via a respective enable signal line. When the storage device controller 118 receives a command, the controller may determine which memory partition the command is to be sent to (which may be the partition addressed by the host or a replacement partition) and enables the respective signal line so that the memory partition 122 knows that the command placed on the bus is destined for that memory partition 122. The memory partition may then consume that command while the other memory partitions that do not receive an enable signal on their respective enable signal line ignore the command on the bus.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
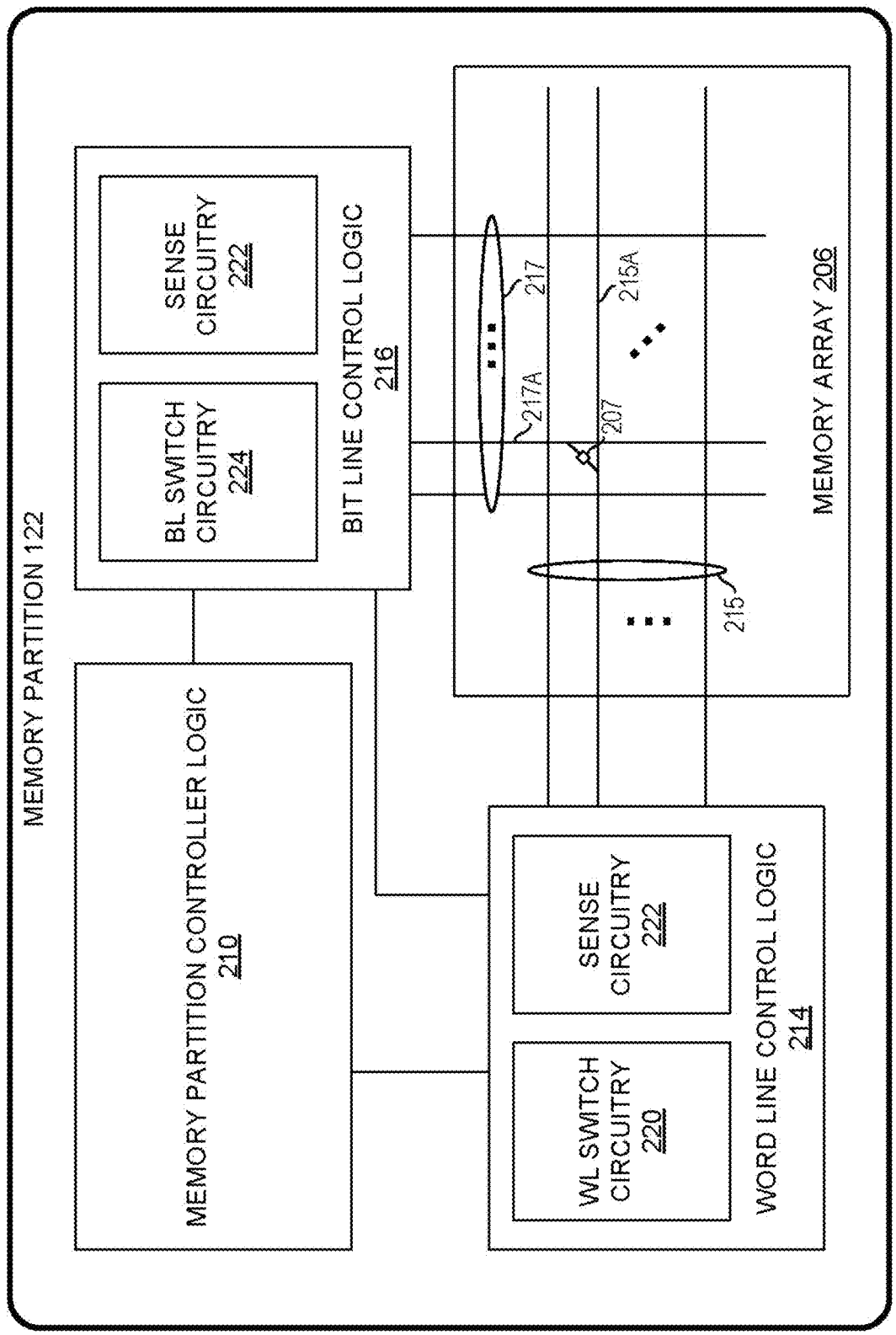
FIG. 2 illustrates an example memory partition in accordance with certain embodiments.

FIG. 2 illustrates an example memory partition 122 in accordance with certain embodiments. In one embodiment, a memory partition 122 may include 3D crosspoint memory or other phase change memory. Phase change memory typically uses a chalcogenide material for the memory elements. A memory element is the unit that actually stores information. In operation, the phase change memory stores information on the memory element by changing the phase of the memory element between amorphous and crystalline phases. The chalcogenide material may exhibit either a crystalline or an amorphous phase, exhibiting a low or high conductivity. Generally, the amorphous phase has a low conductivity (high impedance) and is associated with a reset state (logic zero) and the crystalline phase has a high conductivity (low impedance) and is associated with a set state (logic one). The memory element may be included in a memory cell that also includes a selector, i.e., a select device coupled to the memory element. The select devices are configured to facilitate combining a plurality of memory elements into an array.

In a 3D crosspoint memory array, phase change memory elements may be arranged in a cross-point memory array including row address lines and column address lines arranged in a grid. The row address lines and column address lines, called word lines (WLs) and bit lines (BLs), respectively, cross in the formation of the grid and each memory cell is coupled between a WL and a BL where the WL and BL cross (i.e., cross-point). It should be noted that row and column are terms of convenience used to provide a qualitative description of the arrangement of WLs and BLs in cross-point memory.

During a programming operation (i.e., a write operation), the phase of the memory element may be changed by the application of a first bias voltage to the WL and a second bias voltage to the BL resulting in a differential bias voltage across the memory cell that may cause a current to flow in the memory element. The differential bias voltage may be maintained across the memory cell for a first time period sufficient to cause the memory element to "snap back" and then maintained for a second time period to transition the memory element from the amorphous state to the crystalline state or from the crystalline state to the amorphous state. Snap back is a property of the composite memory element that results in an abrupt change in conductivity and an associated abrupt change in the voltage across the memory element.

In a read operation, a target memory cell is selected via the application of a first bias voltage to the WL and a second bias voltage to the BL that cross at the target memory cell for a time interval. A resulting differential bias voltage across the memory element is configured to be greater than a maximum set voltage and less than a minimum reset voltage for the memory element. In response, the target memory element may or may not snap back, depending on whether the memory element is in the crystalline state (set) or the amorphous state (reset). Sense circuitry, coupled to the memory element, is configured to detect the presence or absence of snap back in a sensing time interval. The presence of snap back may then be interpreted as a logic one and the absence of snap back as a logic zero.

In the embodiment of FIG. 2, a memory partition 122 includes memory partition controller logic 210, word line control logic 214, bit line control logic 216, and memory array 206. A host device (e.g., CPU 102) may provide read and/or write requests including memory address(es) and/or associated data to memory partition 122 (via storage device controller 118) and may receive read data from memory partition 122 (via the storage device controller 118). Memory partition controller logic 210 (in conjunction with word line control logic 214 and bit line control logic 216) is configured to perform memory access operations, e.g., reading a target memory cell and/or writing to a target memory cell.

Memory array 206 corresponds to at least a portion of a phase change cross-point memory (e.g., 3D crosspoint memory) and includes a plurality of word lines 215, a plurality of bit lines 217 and a plurality of memory cells, e.g., memory cell 207. Each memory cell is coupled between a word line ("WL") and a bit line ("BL") at a cross point of the WL and the BL. Each memory cell includes a memory element configured to store information and may include a memory cell select device (i.e., selector) coupled to the memory element. Select devices may include ovonic threshold switches, diodes, bipolar junction transistors, field-effect transistors, etc. Memory array 206 is configured to store binary data and may be written to (i.e., programmed) or read from.

Memory partition controller logic 210 may manage communications with storage device controller 118. In a particular embodiment, memory partition controller logic 210 may analyze one or more signals received from the storage device controller 118 to determine whether a command sent via a bus is to be consumed by the memory partition 122. For example, logic 210 may analyze an address of the command or the value on an enable signal line coupled to the storage device controller 118. Logic 210 may be configured to identify one or more target WLs associated with a received memory address (this memory address may be a separate address from the memory partition address that identifies the memory partition 122, although a portion of an address field of a command may identify the memory partition while another portion of the address field may identify one or more WLs). Memory partition controller logic 210 may be configured to manage operations of WL control logic 214 and BL control logic 216 based, at least in part, on the target WL identifiers.

WL control logic 214 includes WL switch circuitry 220 and sense circuitry 222. WL control logic 214 is configured to receive target WL address(es) from memory partition controller logic 210 and to select one or more WLs for reading and/or writing operations. For example, WL control logic 214 may be configured to select a target WL by coupling a WL select bias voltage to the target WL. WL control logic 214 may be configured to deselect a WL by decoupling the target WL from the WL select bias voltage and/or by coupling a WL deselect bias voltage to the WL. WL control logic 214 may be coupled to a plurality of WLs 215 included in memory array 206. Each WL may be coupled to a number of memory cells corresponding to a number of BLs 217. WL switch circuitry 220 may include a plurality of switches, each switch configured to couple (or decouple) a respective WL, e.g., WL 215A, to WL select bias voltage to select the respective WL 215A. For example, switch circuitry 220 may include a plurality of transistors.

BL control logic 216 includes BL switch circuitry 224. In some embodiments, BL control logic 216 may include sense circuitry, e.g., sense circuitry 222. BL control logic 216 is configured to select one or more BLs for reading and/or writing operations. BL control logic 216 may be configured to select a target BL by coupling a BL select bias voltage ($V_{PP}$) to the target BL. For example, $V_{PP}$ may have a value of 5.0 volts. BL control logic 216 may be configured to deselect a BL by decoupling the target BL from the BL select bias voltage and/or by coupling a BL deselect bias voltage to the BL. BL switch circuitry 224 is similar to WL switch circuitry 220 except BL switch circuitry 224 is configured to couple the BL select bias voltage to a target BL.

Sense circuitry 222 is configured to detect presence or absence of a snap back event during a sense interval, e.g., during a read operation. Sense circuitry 222 is configured to provide a logic level output related to the result of the read operation to, e.g., memory partition controller logic 210. For example, a logic level corresponding to a logic one may be output if a snap back is detected and a logic level corresponding to a logic zero may be output if a snap back is not detected.

For example, in response to a signal from memory partition controller logic 210, WL control logic 214 and BL control logic 216 may be configured to select a target memory cell, e.g. memory cell 207, for a read operation by coupling WL 215A to WL select bias voltage and BL 217A to BL select bias voltage. One or both of sense circuitries 222 may then be configured to monitor WL 215A and/or BL 217A for a sensing interval in order to determine whether or not a snap back event occurs. If a sense circuitry 222 detects a snap back event, then memory cell 207 may be in the set state. If a sense circuitry 222 does not detect a snap back event in the sensing interval, then memory cell 207 may be in the reset state.

Thus, WL control logic 214 and/or BL control logic 216 may be configured to select a target memory cell for a read operation, initiate the read operation, monitor the selected memory cell for a snap back event in a sensing interval and provide the result of the sensing to, e.g., memory partition controller logic 210.

Figure 3:
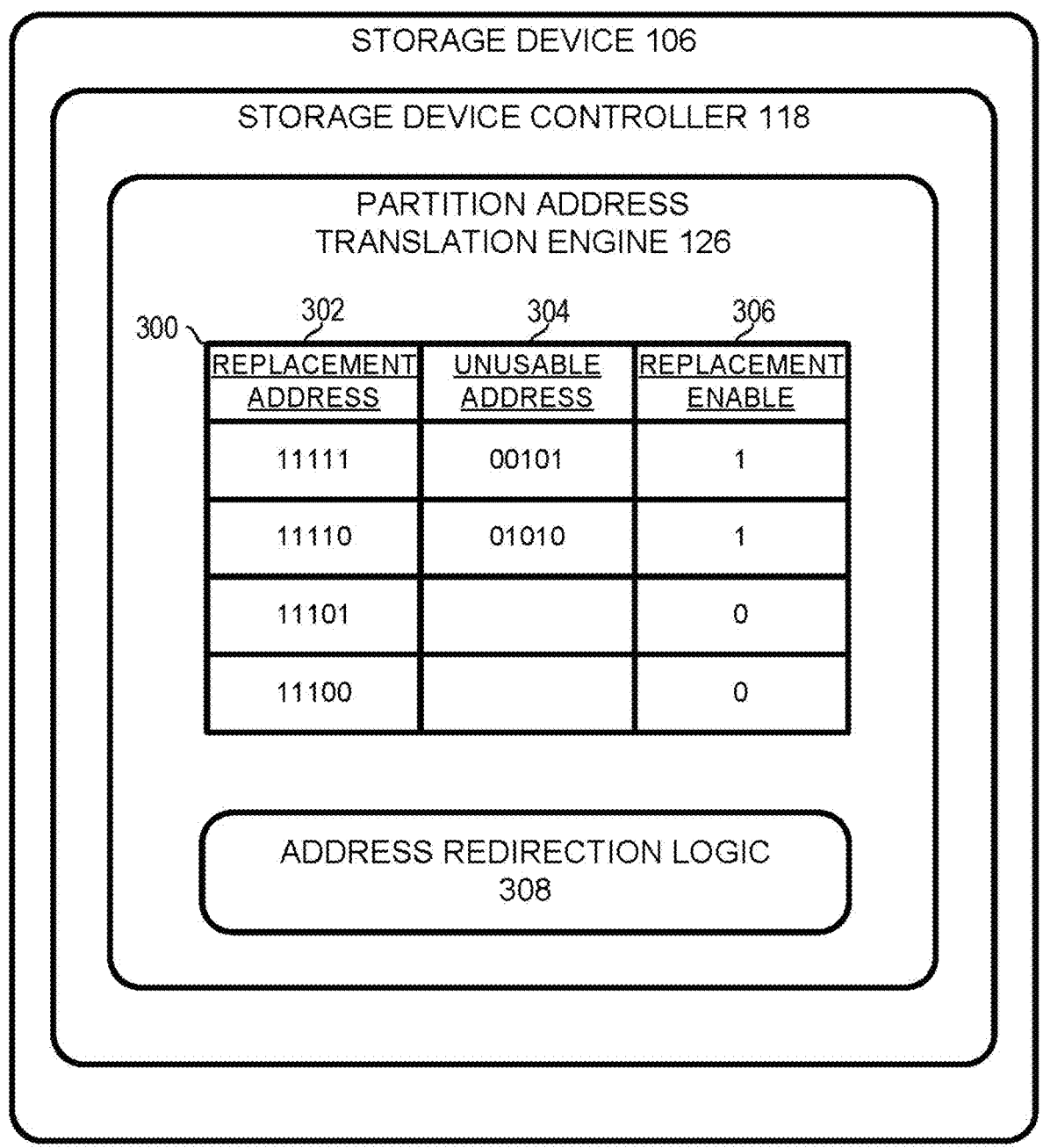
FIG. 3 illustrates an example partition address translation engine 126 in accordance with certain embodiments.

FIG. 3 illustrates an example partition address translation engine 126 in accordance with certain embodiments. Engine 126 includes partition address mapping table 300 and address redirection logic 308. Table 300 represent a possible implementation for mapping bad memory partition addresses to replacement memory partition addresses, though other embodiments may utilize any suitable structures storing such mapping information.

In the illustrated embodiment, table 300 includes four entries, though a partition address mapping table may have any suitable number of entries (e.g., one for each memory partition that may function as a replacement partition or other suitable number). Each entry of the table 300 includes storage for a replacement address 302 (i.e., an address of a memory partition 122 that may be used as a replacement partition), an unusable address 304 (i.e., an address of a memory partition 122 that is determined via testing to be unusable), and a replacement enable bit. The unusable address of an entry is mapped to the replacement address of the entry. That is, the replacement address represents the memory partition address of the memory partition that is to be written to or read from when a host (e.g., CPU 102) sends a write or a read command referencing the unusable address if the replacement enable bit of the entry is set.

The partition address translation engine 126 or other portion of storage device 106 may include any suitable memory type for storing a replacement address to unusable address mapping structure (e.g., table 300) and related information (e.g., replacement enable bits 306) and any suitable logic for changing values stored in the mapping structure (e.g., in response to a request from a device testing the memory partitions 122) and reading values from the mapping structure (e.g., to provide the values to the storage device controller 118 for use in memory access operations). In various embodiments, the mapping structure may be implemented in a register file or other suitable storage media. In various embodiments, storage media for the mapping structure may be integrated on the same package or chip as the storage device controller 118 and/or partition address translation engine 126 to enable quick access of the data in the mapping structure.

In a particular embodiment, the values of the replacement addresses 302 of the table may be fixed (e.g., they may not be changed by a command from the host or other logic) based on memory partitions 122 that are designated as replacement memory partitions. For example, the value of these bits may be fixed during fabrication based on the circuit design. In another embodiment, the replacement address values may be set by testing logic before a storage device is shipped to an end user.

In a particular embodiment, a fixed (or variable) number of memory partitions 122 that have the highest memory partition addresses are used as the replacement memory partitions in order to simplify the address remapping operations to provide contiguously addressable memory partitions to the host computing device. For example, in the embodiment depicted, memory partitions having addresses of b11100, b11101, b11110, and b11111 are selected from 32 total memory partitions of a storage device to serve as replacement partitions. In other embodiments, the addressing order of the replacement partitions may be determined in any other manner. If a replacement partition is determined to be unusable, then it will not be used as a replacement partition and the replacement enable bit for the corresponding table entry may be set to 0 (and/or the address of a different replacement partition may be stored in table 300).

In various embodiments, after a storage device is manufactured, the memory partitions 122 may be tested (e.g., via scan chain operations) to determine whether they are usable. Each memory partition that is unusable may be mapped to a replacement partition of the storage device. As one example, in the depicted embodiment, the memory partitions having addresses of b00101 and b01010 were deemed unusable and have been mapped to replacement partitions having addresses of b11111 and b11110 respectively in the first two entries of table 300. The mapping also includes setting replacement enable bits 306 associated with the replacement partitions (e.g., setting the bits in the table entries corresponding to the replacement partitions).

Address redirection logic 308 may be operable to determine an address of an incoming memory access command from a computing host device and determine which memory partition the command should be sent to. In a particular embodiment, address redirection logic 308 may first determine whether any of the replacement enable bits are set for the replacement partitions. In a particular embodiment, the logic 308 may do this without accessing table 300. For example, the logic 308 may access logic that receives the replacement enable bit values as inputs and outputs an indication of whether any of the bits are set. In other embodiments, a global enable bit may be set at the time of testing based on whether any of the memory partitions failed testing. In another embodiment, logic 308 may access the table 300 to determine whether any of the replacement bits are set.

If the logic 308 determines that no replacement enable bits are set, then the logic 308 does not need to access table 300 and does not provide memory partition address translation, rather the incoming commands are sent to the same partitions addressed by the commands. In particular embodiments, address redirection logic 308 (and/or the memory implementing table 300) may be permanently disabled at the time of memory partition testing if no memory partitions fail testing.

If the logic 308 determines that at least one enable bit is set, then each time the logic 308 receives an incoming command, a determination is made by the logic 308 as to whether the partition address in the incoming command is mapped to a replacement address (e.g., by accessing table 300 or other mapping structure). In a particular embodiment, the incoming partition address may be compared against each entry in the table 300 that includes a replacement enable bit that is set. If the logic 308 determines that the incoming address is an address of an unusable memory partition, then the address of the corresponding replacement memory partition is identified by the logic 308 (e.g., via table 300 or other mapping structure) and used in place of the incoming address. In various embodiments, this may involve replacing the address of the command with the replacement address or otherwise causing the command (or a command based thereon) to be redirected to the replacement partition (e.g., by setting an enable signal line coupled to the replacement partition).

In this manner, commands sent to unusable partitions are redirected within the storage device 106 in a manner that is imperceptible to the host computing device (as it will believe that memory access commands sent to bad memory partitions executed properly). Thus the host computing device does not need to track which memory partitions of the storage device are bad.

In a particular embodiment, the number of good storage partitions is provided to the host computing device in any suitable manner. For example, the storage device controller 118 may be configured to send an indication of the number of available memory partitions to the host computing device when the host requests such. Accordingly, the host only needs to track the number of memory partitions that are available for the particular storage device. In various embodiments, the host may constrain its requests to the available memory partitions.

In a particular embodiment, if the host sends a memory access command to an address of a replacement partition, the command will result in the storage device controller 118 ignoring the command. For example, referring to the embodiment of FIG. 3, if the host were to send a command with a memory partition address of b11111 (which references a replacement partition being used for host requests to the memory partition address b00101), then the storage device controller 118 would simply ignore the command. In an alternative embodiment, the storage device controller 118 may return an error to the host when such a command is received. In various embodiments, a determination that a command is being addressed to a replacement partition may be made in any suitable manner. For example, table 300 may be accessed to determine whether a replacement enable bit is set for the entry having the incoming address as the replacement address. In alternative embodiments, other suitable mapping structures could be accessed to determine the same.

Because the replacement memory partitions having addresses of b11101 and b11100 are not needed as replacement memory partitions (because only two memory partitions are unusable), their corresponding replacement enable bits are not set and the value of the unusable address 304 portions of the table entries are ignored.

Figure 4:
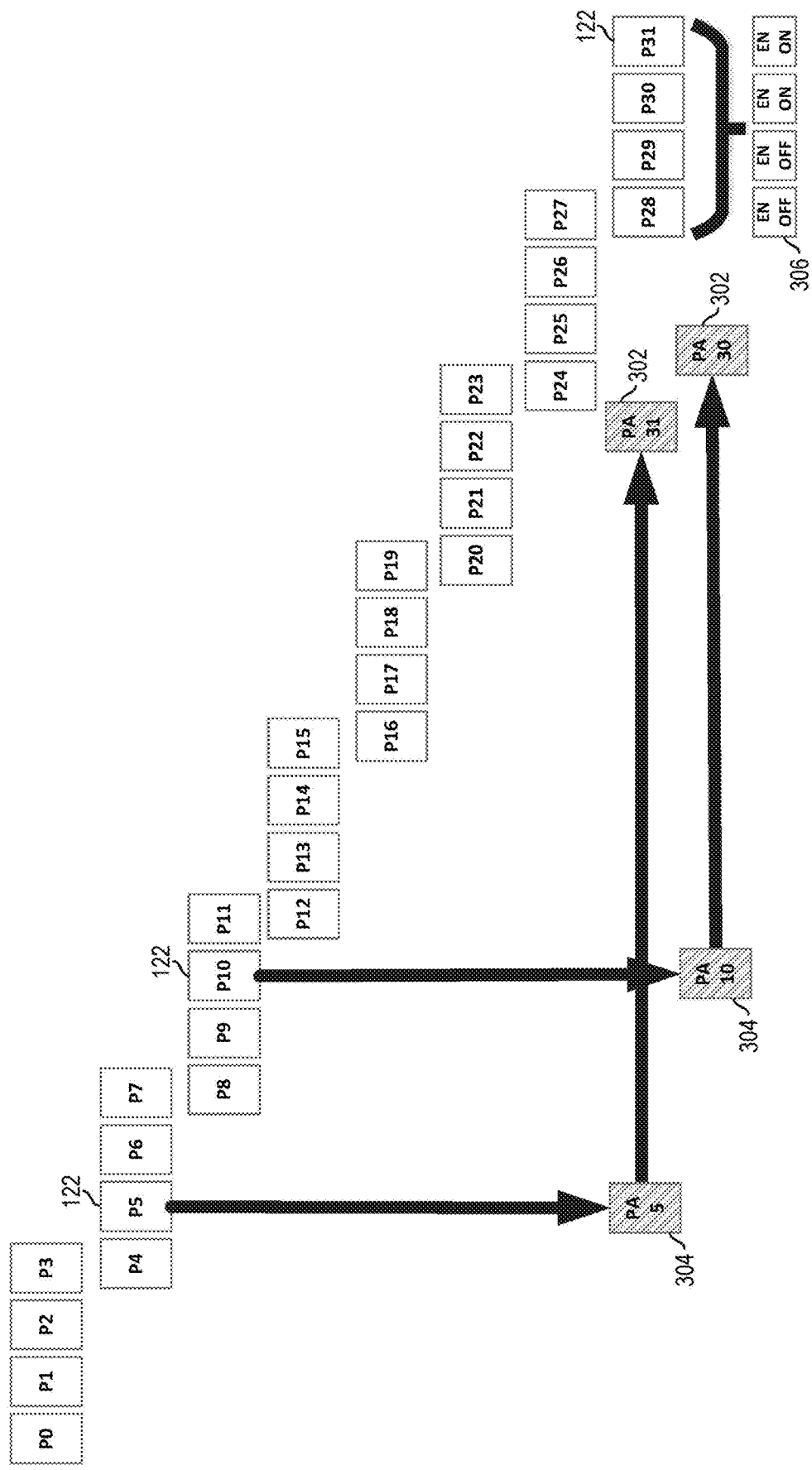
FIG. 4 illustrates an example memory comprising unusable partitions and replacement partitions in accordance with certain embodiments.

FIG. 4 illustrates an example memory comprising unusable partitions and replacement partitions in accordance with certain embodiments. FIG. 4 aligns with the partition address mapping table 300 of FIG. 3. In this embodiment, the memory includes 32 memory partitions (P0-P31). All of the partitions except P5 and P10 are usable. Partitions P28-P31 are designated as replacement partitions. Memory partition P5 is uniquely identified by partition address PA5 (b00101) and memory partition 10 is uniquely identified by PA10 (b01010). Replacement memory partition P31 is uniquely identified by partition address PA31 (b11111) and replacement memory partition P30 is uniquely identified by partition address PA30 (b11110).

Because P5 is identified as an unusable memory partition, address PA5 is mapped to address PA31 of replacement partition P31 and the corresponding replacement enable bit is set. Similarly, because P10 is identified as an unusable memory partition, address PA10 is mapped to address PA30 of replacement partition P30 and the corresponding replacement enable bit is set. The other usable partitions are not remapped. Because replacement partitions P28 and P29 are not needed as replacement partitions, their respective enable bits are not set and these partition may function normally (i.e., incoming commands with the partition address of P28 and P29 will be sent to P28 and P29 respectively).

Under this embodiment, the storage device controller 118 may report that the storage device 106 includes 30 usable partitions. Accordingly, the host device may properly address commands to contiguous partition addresses b00000-b11101 and the storage device 106 will execute the commands on memory partitions that passed testing (i.e., each of the memory partitions excepting P5 and P10).

Figure 5:
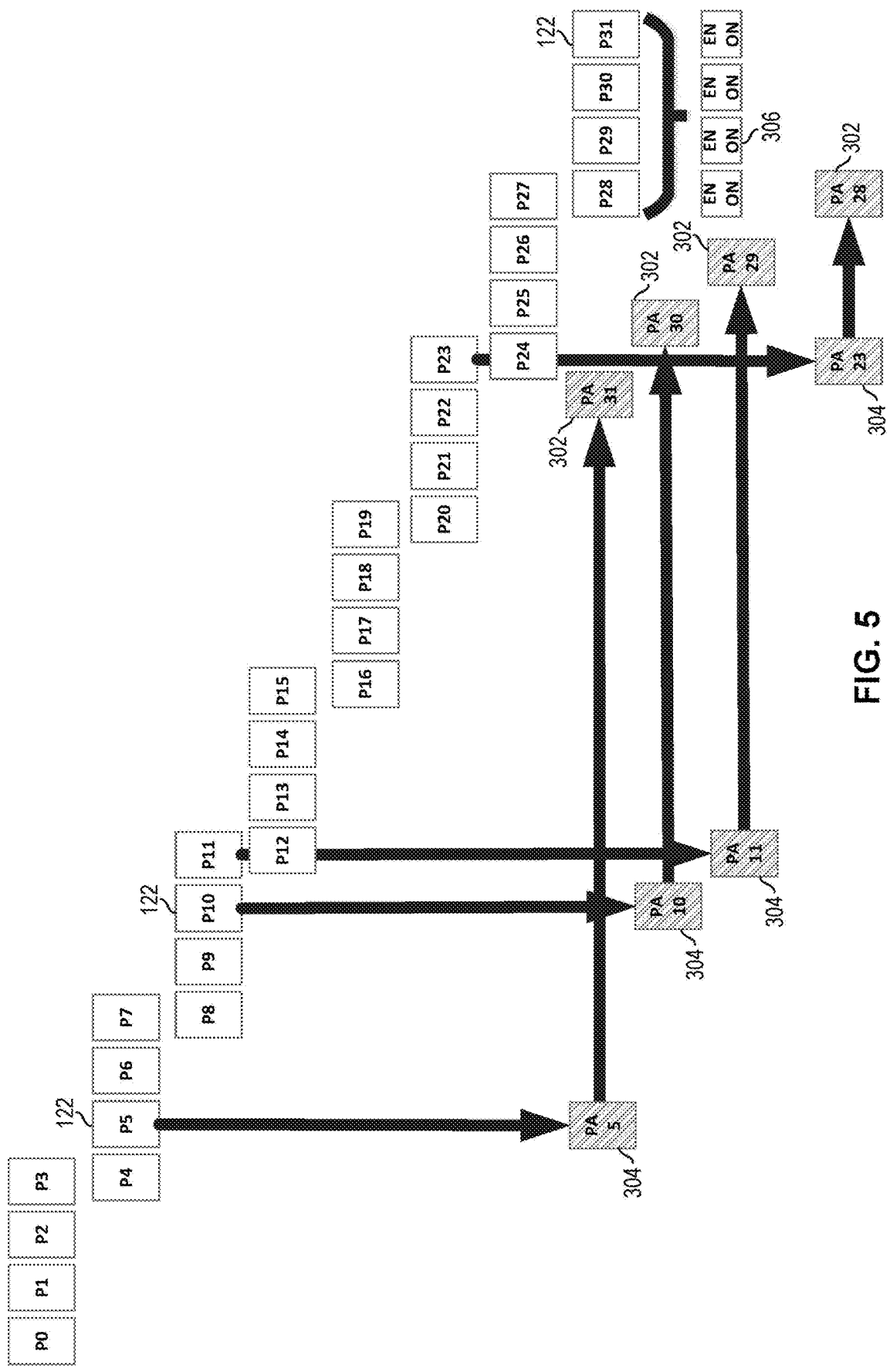
FIG. 5 illustrates an example memory comprising unusable partitions and replacement partitions in accordance with certain embodiments.

FIG. 5 illustrates another example memory comprising unusable partitions and replacement partitions in accordance with certain embodiments. This embodiment also includes 32 memory partitions (P0-P31). In this embodiment, in addition to P5 and P10, partitions P11 and P23 are unusable. Accordingly, the addresses for those partitions have been mapped to the address of replacement partitions P29 and P28 respectively and the respective replacement enable bits have been set.

Under this embodiment, the storage device controller 118 may report that the storage device 106 includes 28 usable partitions. Accordingly, the host device may properly address commands to contiguous partition addresses b00000-b11011 and the storage device 106 will execute the commands on memory partitions that passed testing (i.e., each of the memory partitions excepting P5, P10, P11, and P23).

Figure 6:
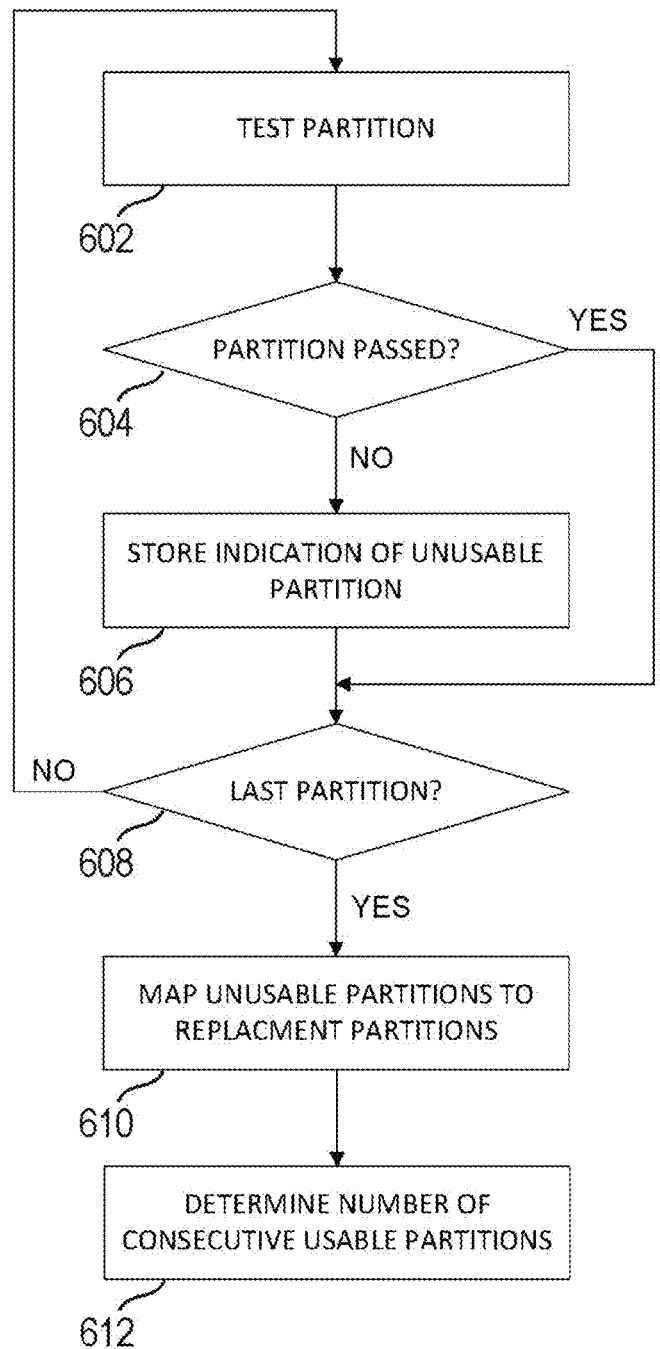
FIG. 6 illustrates an example flow for mapping unusable partitions to replacement partitions in accordance with certain embodiments.

FIG. 6 illustrates an example flow 600 for mapping unusable partitions to replacement partitions in accordance with certain embodiments. In flow 600, each memory partition 122 of a memory 116 may be tested to determine which partitions are usable. In a particular embodiment, the partitions are tested in an ascendant order (i.e., P0 is tested first, then P1, etc.) although the partitions may be tested in any suitable order. In addition, replacement partitions may be mapped to unusable partitions in a descendant order (i.e., the partition with the highest address is mapped to the first unusable partition, the partition with the second highest address is mapped to the second unusable partition, etc.) although any suitable mapping order may be used.

At 602, a partition is tested. Any suitable testing may be performed. For example, data may be written to various memory cells of the memory partition and data may be read from the memory cells to determine whether it matches the input data. Other suitable tests may be performed to determine whether the partition is functional. In various embodiments, testing may involve performing scan chain operations (e.g., via Joint Test Action Group (JTAG) scanning or other suitable scanning mechanism). In various embodiments, the testing is performed after the memory partitions are fabricated and before the storage device is shipped to a customer.

At 604 a determination is made as to whether the memory partition passed testing. If the memory partition passed, the flow moves to 608. If the memory partition did not pass testing, then an indication of the unusable partition is stored at 606. At 608, it is determined whether the tested partition was the last partition to be tested. If it was not, then the flow returns to 602 and the next partition is tested. If it was the last partition, the flow moves to 610, where any unusable partitions (i.e., partitions failing the testing) are mapped to replacement partitions (that did not fail testing). The mapping may be performed in any suitable manner. For example, a table (such as table 300 may be updated by setting the appropriate replacement enable bits and writing the addresses of the unusable partitions into entries that include the addresses of the replacement partitions. In a particular embodiment, if no unusable partitions were found, then the partition address mapping logic (that would normally redirect requests to the replacement partitions) may be configured to remain inactive during storage device operation so as not to draw power.

At 612, the number of consecutive usable partitions is determined (e.g., by subtracting the number of unusable partitions from the number of total partitions). An indication of the number of consecutive usable partitions may be stored by the storage device 106 such that the number may be communicated to a host computing device.

The flow described in FIG. 6 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 6 may be repeated, combined, modified or deleted where appropriate. Additionally, operations may be performed in any suitable order without departing from the scope of particular embodiments. In various embodiments, operations may be performed concurrently. For example, in a particular embodiment, the memory partitions 122 may be tested at the same time.

Figure 7:
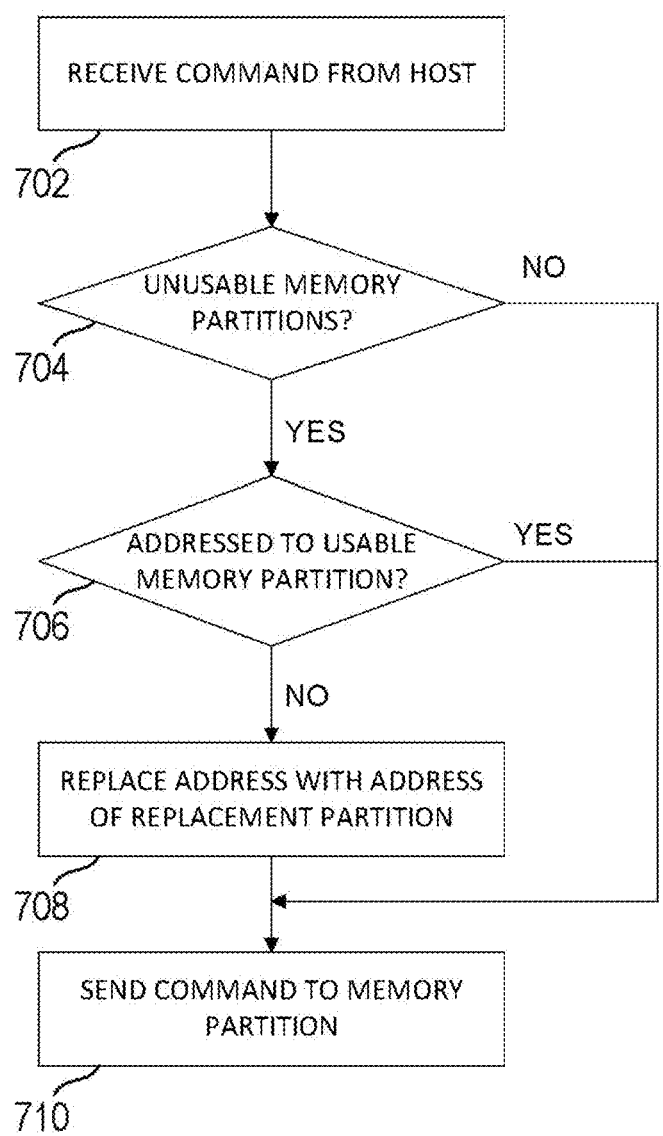
FIG. 7 illustrates an example flow for redirecting a memory access command from a host computing device in accordance with certain embodiments.

FIG. 7 illustrates an example flow for redirecting a memory access command from a host computing device in accordance with certain embodiments. The various operations may be performed by, e.g., a storage device controller 118 of a storage device 106.

At 702, a memory access command (such as a request for performance of a read operation or a write operation) is received from a host computing device. At 704, it is determined whether the storage device 106 includes any unusable memory partitions. If all of the partitions of the storage device are usable then the flow moves to 710 where the command (or a command based on the command) is sent to the memory partition addressed by the received memory access command.

If the storage device contains one or more unusable memory partitions, then the flow moves to 706, where a determination is made as to whether the command is addressed to a usable memory partition. If the command is addressed to a usable memory partition, then the command (or a command based therefrom) is sent to the memory partition at 710. If the command is not addressed to a usable memory partition, then the address of the command is replaced by an address of a replacement partition at 708. The command (or a command based therefrom) is then sent to the replacement memory partition at 710. In other embodiments, instead of explicitly replacing the address, the command (or a command based therefrom) is redirected to the replacement partition using any other suitable mechanisms.

The flow described in FIG. 7 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 7 may be repeated, combined, modified or deleted where appropriate. Additionally, operations may be performed in any suitable order without departing from the scope of particular embodiments. In various embodiments, operations may be performed concurrently.

As used herein, redirecting a memory access command from a host to a replacement partition may encompass sending a command derived from the received command to the replacement partition. For example, the storage device controller 118 may perform modifications to the received command before redirecting the command to the replacement partition. As an example, the storage device controller 118 may remove the memory partition address specified from the received command. As another example, the storage device controller 118 may add the memory partition address of the replacement partition to the command. As another example, the storage device controller may convert the command into a format that is compatible with memory partitions 122. As another example, As another example, the host may send a batch memory access command that specifies a number of commands requesting memory access operations for a plurality of consecutive memory partitions and the storage device controller 118 may send commands to the respective memory partitions (or corresponding replacement partitions) in a sequential order.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as CPU 102, external I/O controller 104, processor 108, cores 114A and 114B, I/O controller 110, CPU memory controller 112, storage device 106, system memory device 107, storage device 106, memory 116, storage device controller 118, memory partition 122, program control logic 124, partition address translation engine 126, memory partition controller logic 210, word line control logic 214, bit line control logic 216, table 300, address redirection logic 308, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In at least one embodiment, an apparatus comprises a plurality of memory partitions, each memory partition comprising an array of 3D crosspoint memory; and a storage device controller comprising a memory comprising memory cells to store addresses of replacement memory partitions and addresses of unusable memory partitions and a partition address translation engine coupled to the memory, the partition address translation engine comprising logic to determine whether to redirect a memory access command received from a host computing device to a replacement memory partition based on the contents of the memory.

In an embodiment, the storage device controller is to communicate a total number of consecutively addressable usable memory partitions of the plurality of memory partitions to the host computing device. In an embodiment, the memory further comprises memory cells to store enable bits in association with the addresses of replacement memory partitions, wherein the value of an enable bit indicates whether a corresponding replacement memory partition is to be addressable by the host computing device via an address of an unusable memory partition or via an address of the replacement memory partition. In an embodiment, a first memory partition of the plurality of memory partitions is to perform a memory access operation in parallel with a memory access operation performed by a second memory partition of the plurality of memory partitions. In an embodiment, the replacement memory partitions comprise a plurality of consecutively numbered memory partitions of the plurality of memory partitions. In an embodiment, the replacement memory partitions include a memory partition with the highest memory partition address of the plurality of memory partitions. In an embodiment, the storage device controller is further to block a command addressed to a replacement memory partition upon a determination that the replacement memory partition is being used in place of an unusable memory partition. In an embodiment, an apparatus further comprises a bus to couple the storage device controller to each of the memory partitions. In an embodiment, the partition address translation engine is to redirect the memory access command from the host computing device to the replacement memory partition by replacing a memory partition address of the memory access command with a memory partition address of the replacement memory partition. In an embodiment, the partition address translation engine is to redirect the memory access command from the host computing device to the replacement memory partition by sending an enable signal to the replacement memory partition.

In at least one embodiment a method comprises receiving a memory access command from a host computing device at a storage device comprising a plurality of memory partitions, each memory partition comprising an array of 3D crosspoint memory, wherein the memory access command specifies a memory partition address; and determining whether to redirect the memory access command to a replacement memory partition of the plurality of memory partitions based on contents of a memory that includes storage for mapping an address of an unusable memory partition to an address of the replacement memory partition. In an embodiment, a method further comprises communicating a total number of consecutively addressable usable memory partitions of the plurality of memory partitions to the host computing device. In an embodiment, the memory comprises memory cells to store enable bits in association with addresses of a plurality of replacement memory partitions, wherein the value of an enable bit indicates whether a corresponding replacement memory partition is to be addressable by the host computing device via an address of an unusable memory partition or via an address of the replacement memory partition. In an embodiment, a method further comprises performing, by a first memory partition of the plurality of memory partitions, a memory access operation in parallel with a memory access operation performed by a second memory partition of the plurality of memory partitions. In an embodiment, replacement memory partitions of the plurality of memory partitions comprise a plurality of consecutively numbered memory partitions of the plurality of memory partitions. In an embodiment, replacement memory partitions include a memory partition with the highest memory partition address of the plurality of memory partitions. In an embodiment, a method further comprises blocking a command addressed to a replacement memory partition upon a determination that the replacement memory partition is being used in place of an unusable memory partition. In an embodiment, a method further comprises communicating the memory access command to a replacement partitions via a bus coupling a storage device controller to each of the memory partitions. In an embodiment, redirecting the memory access command from the host computing device to the replacement memory partition includes replacing a memory partition address of the memory access command with a memory partition address of the replacement memory partition. In an embodiment, redirecting the memory access command from the host computing device to the replacement memory partition includes sending an enable signal to the replacement memory partition.

In at least one embodiment, a method comprises testing functionality of a plurality of memory partitions of a first storage device, each memory partition comprising an array of 3D crosspoint memory; and in response to determining that a memory partition of the plurality of memory partitions of the first storage device is not usable, mapping a memory partition address of the unusable memory partition to a memory partition address of a replacement memory partition such that memory access commands addressed, by a host, to the unusable memory partition are to be redirected to the replacement memory partition.

In an embodiment, a method further comprises testing the plurality of memory partitions in an ascendant order and mapping a first memory partition that is found to be unusable to a replacement partition that has the highest memory partition address of the plurality of memory partitions. In an embodiment, a method further comprises determining a total number of unusable memory partitions of the first storage device and storing an indication of the total number on the first storage device. In an embodiment, a method further comprises testing functionality of a plurality of memory partitions of a second storage device, each memory partition of the second storage device comprising an array of 3D crosspoint memory; and in response to a determination that all memory partitions of the second storage device are usable, disabling memory partition redirection logic of the second storage device. In an embodiment, a method further comprises setting a replacement enable bit associated with the unusable memory partition in response to the determination that the memory partition is not usable.

In at least one embodiment, a system comprises a plurality of memory partitions, each memory partition comprising an array of 3D crosspoint memory; means to store addresses of replacement memory partitions and addresses of unusable memory partitions; and means to determine whether to redirect a memory access command received from a host computing device to a replacement memory partition based on the contents of the memory.

In an embodiment, a system further comprises means to communicate a total number of consecutively addressable usable memory partitions of the plurality of memory partitions to the host computing device. In an embodiment, a system further comprises means to store enable bits in association with the addresses of replacement memory partitions, wherein the value of an enable bit indicates whether a corresponding replacement memory partition is to be addressable by a host computing device via an address of an unusable memory partition or via an address of the replacement memory partition. In an embodiment, a first memory partition of the plurality of memory partitions is to perform a memory access operation in parallel with a memory access operation performed by a second memory partition of the plurality of memory partitions. In an embodiment, the replacement memory partitions comprise a plurality of consecutively numbered memory partitions of the plurality of memory partitions.

In at least one embodiment, a non-transitory machine readable storage medium has instructions stored thereon, the instructions when executed by a machine to cause the machine to test functionality of a plurality of memory partitions of a first storage device, each memory partition comprising an array of 3D crosspoint memory; and in response to determining that a memory partition of the plurality of memory partitions of the first storage device is not usable, map a memory partition address of the unusable memory partition to a memory partition address of a replacement memory partition such that memory access commands addressed, by a host, to the unusable memory partition are to be redirected to the replacement memory partition.

In an embodiment, the instructions are further to cause the machine to test the plurality of memory partitions in an ascendant order and to map a first memory partition that is found to be unusable to a replacement partition that has the highest memory partition address of the plurality of memory partitions. In an embodiment, the instructions are further to cause the machine to determine a total number of unusable memory partitions of the first storage device and store an indication of the total number on the first storage device. In an embodiment, the instructions are further to cause the machine to test functionality of a plurality of memory partitions of a second storage device, each memory partition of the second storage device comprising an array of 3D crosspoint memory; and in response to a determination that all memory partitions of the second storage device are usable, disable memory partition redirection logic of the second storage device. In an embodiment, the instructions are further to cause the machine to set a replacement enable bit associated with the unusable memory partition in response to the determination that the memory partition is not usable.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a plurality of memory partitions, each memory partition comprising an array of non-volatile memory; and
   a storage device controller comprising:
      a memory to store a plurality of entries, each entry including a first field for an address of a replacement partition, a second field for an address of an unusable memory partition, and a third field for an enable bit indicating whether an address stored in the second field is to be remapped to an address of the replacement partition stored in the first field; and
      a partition address translation engine coupled to the memory, the partition address translation engine comprising logic to determine whether to redirect a memory access command received from a host computing device to a replacement memory partition, wherein the partition address translation engine is configured to:
  identify a first address associated with an incoming request;
  identify a first entry from the plurality of entries that includes the first address in the second field of the entry; and
  responsive to a determination that the third field of the first entry includes a bit that is set, utilize the address of the replacement memory partition in the first field of the first entry in place of the first address; and
circuitry to permanently disable the memory to store the plurality of entries if none of the plurality of memory partitions are unusable.

2. The apparatus of claim 1, wherein the storage device controller is to communicate a total number of consecutively addressable usable memory partitions of the plurality of memory partitions to the host computing device.

3. The apparatus of claim 1, wherein the partition address translation engine is to:
  determine whether a global indicator is set or not set, wherein the global indicator is set when any one or more memory partitions of a first plurality of the plurality of memory partitions are determined to be unusable and are mapped to one or more replacement memory partitions, wherein the global indicator is not set when none of the first plurality of memory partitions are mapped to replacement memory partitions;
  search the memory to determine a replacement memory partition address for the memory access command responsive to a determination that the global indicator is set; and
  omit searching of the memory responsive to a determination that the global indicator is not set.

4. The apparatus of claim 1, wherein the partition address translation engine is to:
  identify a second address associated with a second incoming request;
  responsive to searching the memory and determining that no entries include the second address in the second field, performing the second incoming request utilizing the second address.

5. The apparatus of claim 1, wherein the replacement memory partition is included in a plurality of consecutively numbered memory partitions of the plurality of memory partitions.

6. The apparatus of claim 5, wherein a plurality of unusable memory partitions are to be mapped by the memory to a plurality of replacement memory partitions in an ascendant order of addresses of the plurality of unusable memory partitions and a descendant order of addresses of the plurality of replacement memory partitions, such that a first unusable memory partition having a lowest valued address of addresses of the plurality of unusable memory partitions is mapped to a first replacement memory partition having a highest address among addresses of the plurality of replacement memory partitions and a second unusable memory partition having a second lowest valued address of addresses among addresses of the plurality of unusable memory partitions is mapped to a second replacement memory partition having a second highest address of addresses of the plurality of replacement memory partitions.

7. The apparatus of claim 1, wherein the storage device controller is further to block a command addressed to a replacement memory partition upon a determination that the replacement memory partition is being used in place of an unusable memory partition.

8. The apparatus of claim 1, further comprising a bus to couple the storage device controller to each of the memory partitions.

9. The apparatus of claim 1, wherein the partition address translation engine is to redirect the memory access command from the host computing device to the replacement memory partition by replacing a memory partition address of the memory access command with a memory partition address of the replacement memory partition.

10. The apparatus of claim 1, wherein the partition address translation engine is to redirect the memory access command from the host computing device to the replacement memory partition by sending an enable signal to the replacement memory partition.

11. A non-transitory machine readable storage medium having instructions stored thereon, the instructions when executed by a machine to cause the machine to:
  test functionality of a plurality of memory partitions of a first storage device in an ascendant order of addresses of the memory partitions, each memory partition comprising an array of 3D crosspoint memory;
  configure an indicator based on results of the functionality testing, wherein the instructions are to cause the indicator to be set when any one or more memory partitions of the plurality of memory partitions are determined to be unusable and are to be mapped to one or more replacement memory partitions, wherein the indicator is not set when none of the first plurality of memory partitions are to be mapped to replacement memory partitions; and
  determine whether any of the plurality of memory partitions are unusable based on the functionality testing, wherein in response to determining that a memory partition of the plurality of memory partitions of the first storage device is unusable, the instructions are to cause the machine to map a memory partition address of the unusable memory partition to a memory partition address of a replacement memory partition such that memory access commands addressed, by a host computing device, to the unusable memory partition are to be redirected to the replacement memory partition, wherein in response to determining that none of the plurality of memory partitions are unusable, the instructions are to cause the machine to permanently disable a memory that is dedicated to mapping unusable memory partitions to replacement partitions.

12. The medium of claim 11, wherein the instructions are further to cause the machine to test the plurality of memory partitions in an ascendant order and to map a first memory partition that is found to be unusable to a replacement partition that has the highest memory partition address of the plurality of memory partitions.

13. The medium of claim 11, wherein the instructions are further to cause the machine to determine a total number of unusable memory partitions of the first storage device and store an indication of the total number on the first storage device.

14. The medium of claim 11, wherein the instructions are further to cause the machine to:
  test functionality of a plurality of memory partitions of a second storage device, each memory partition of the second storage device comprising an array of 3D crosspoint memory; and in response to a determination that all memory partitions of the second storage device are usable, disable memory partition redirection logic of the second storage device.

15. The medium of claim 11, wherein the instructions are further to cause the machine to set a replacement enable bit associated with the unusable memory partition in response to the determination that the memory partition is unusable.

16. A method comprising:
testing functionality of a plurality of memory partitions of a first storage device in an ascendant order of addresses of the memory partitions, each memory partition comprising an array of 3D crosspoint memory;
configuring an indicator based on results of the functionality testing, wherein the indicator is to be set when any one or more memory partitions of the plurality of memory partitions are determined to be unusable and are to be mapped to one or more replacement memory partitions, wherein the indicator is not set and a memory that is dedicated to mapping unusable memory partitions to replacement partitions is permanently disabled when none of the first plurality of memory partitions are to be mapped to replacement memory partitions; and
in response to determining that a memory partition of the plurality of memory partitions of the first storage device is unusable, mapping a memory partition address of the unusable memory partition to a memory partition address of a replacement memory partition such that memory access commands addressed, by a host computing device, to the unusable memory partition are to be redirected to the replacement memory partition.

17. The method of claim 16, further comprising testing the plurality of memory partitions in an ascendant order and mapping a first memory partition that is found to be unusable to a replacement partition that has the highest memory partition address of the plurality of memory partitions.

18. The method of claim 16, further comprising determining a total number of unusable memory partitions of the first storage device and storing an indication of the total number on the first storage device.

19. The method of claim 16, further comprising:
testing functionality of a plurality of memory partitions of a second storage device, each memory partition of the second storage device comprising an array of 3D crosspoint memory; and
in response to a determination that all memory partitions of the second storage device are usable, disabling memory partition redirection logic of the second storage device.

20. The method of claim 16, further comprising setting a replacement enable bit associated with the unusable memory partition in response to the determination that the memory partition is unusable.

21. A system comprising:
a plurality of memory partitions, each memory partition comprising an array of non-volatile memory;
means to store a plurality of entries, each entry including a first field for an address of a replacement partition, a second field for an address of an unusable memory partition, and a third field for an enable bit indicating whether an address stored in the second field is to be remapped to an address of the replacement partition stored in the first field; and
means to determine whether to redirect a memory access command received from a host computing device to a replacement memory partition, wherein the means to determine whether to redirect the memory access command are to:
identify a first address associated with an incoming request;
identify a first entry from the plurality of entries that includes the first address in the second field of the entry; and
responsive to a determination that the third field of the first entry includes a bit that is set, utilize the address of the replacement memory partition in the first field of the first entry in place of the first address;
wherein the means to store the plurality of entries is configured to be permanently disabled if none of the plurality of memory partitions are unusable.

22. The system of claim 21, further comprising means to communicate a total number of consecutively addressable usable memory partitions of the plurality of memory partitions to the host computing device.

23. The system of claim 21, further comprising means to store enable bits in association with addresses of replacement memory partitions, wherein a value of an enable bit indicates whether a corresponding replacement memory partition is to be addressable by a host computing device via an address of an unusable memory partition or via an address of the replacement memory partition.

24. The system of claim 21, wherein a first memory partition of the plurality of memory partitions is to perform a memory access operation in parallel with a memory access operation performed by a second memory partition of the plurality of memory partitions.

25. The system of claim 21, wherein the replacement memory partition is included in a plurality of consecutively numbered memory partitions of the plurality of memory partitions, wherein a plurality of unusable memory partitions are to be mapped, by the means to store the plurality of entries, to a plurality of replacement memory partitions in an ascendant order of addresses of the plurality of unusable memory partitions and a descendant order of addresses of the plurality of replacement memory partitions, such that a first unusable memory partition having a lowest valued address of addresses of the plurality of unusable memory partitions is mapped to a first replacement memory partition having a highest address among addresses of the plurality of replacement memory partitions and a second unusable memory partition having a second lowest valued address of addresses among addresses of the plurality of unusable memory partitions is mapped to a second replacement memory partition having a second highest address of addresses of the plurality of replacement memory partitions.

26. The apparatus of claim 1, the partition address translation engine configured to:
receive a batch memory access command specifying a number of commands requesting memory access operations for a plurality of consecutively addressed memory partitions, wherein the consecutively addressed memory partitions include the first address; and
responsive to the batch memory access command:
access the memory to identify the address of the replacement partition based on the first address; and
send commands to addresses of the consecutively addressed memory partition and send a command to the address of the replacement partition in place of a command to the first address.

27. The apparatus of claim 1, the apparatus further comprising sense circuitry configured to detect presence or absence of a snap back event during a sense interval of a memory partition depending on whether a memory element of the memory partition is in an amorphous or crystalline state.

* * * * *